US008525678B2

(12) United States Patent
Monden

(10) Patent No.: US 8,525,678 B2
(45) Date of Patent: Sep. 3, 2013

(54) BEHAVIOR MONITORING SYSTEM AND BEHAVIOR MONITORING METHOD

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 12/674,295

(22) PCT Filed: Jul. 18, 2008

(86) PCT No.: PCT/JP2008/063052
§ 371 (c)(1),
(2), (4) Date: Mar. 10, 2010

(87) PCT Pub. No.: WO2009/025140
PCT Pub. Date: Feb. 26, 2009

(65) Prior Publication Data
US 2011/0115634 A1 May 19, 2011

(30) Foreign Application Priority Data
Aug. 21, 2007 (JP) ................................ 2007-214976

(51) Int. Cl.
*G08B 23/00* (2006.01)
(52) U.S. Cl.
USPC ...... 340/573.1; 340/540; 340/541; 340/573.4
(58) Field of Classification Search
USPC .................... 340/573.1, 5.7, 540, 541, 573.4
See application file for complete search history.

(56) References Cited

U.S. PATENT DOCUMENTS

| 2004/0263315 | A1* | 12/2004 | Kim et al. ...................... 340/5.7 |
| 2005/0054290 | A1* | 3/2005 | Logan et al. .................. 455/41.2 |
| 2006/0080541 | A1* | 4/2006 | Monaco et al. ............... 713/182 |
| 2007/0083915 | A1* | 4/2007 | Janakiraman et al. ............ 726/4 |

FOREIGN PATENT DOCUMENTS

| CN | 1777281 | 5/2006 |
| CN | 1965337 | 5/2007 |
| JP | 62-245399 | 10/1987 |
| JP | 2002-92601 | 3/2002 |
| JP | 2004-005511 | 1/2004 |

(Continued)

OTHER PUBLICATIONS

Chinese Office Action, dated Jun. 15, 2011 in corresponding Chinese Application No. 200880103734.5 with English translation of the Chinese Office Action.

(Continued)

*Primary Examiner* — Tai T Nguyen
*Assistant Examiner* — Ojiako Nwugo
(74) *Attorney, Agent, or Firm* — Young & Thompson

(57) ABSTRACT

A storage element stores identification information identifying to-be-monitored objects (TBMO) and prohibited behavior conditions indicating behaviors respectively prohibited to the TBMO in an area. Entry monitoring elements monitor as specific TBMO, TBMO which enter the area, and judge whether or not specific identification information identifying the specific to TBMO exists in the identification information stored in the storage element. When identification information coincident with the specific identification information exists in the identification information, behavior monitoring element monitor based on the specific identification information, the specific TBMO which behave in the area, and generate behavior information indicating behaviors of the specific TBMO. Behavior judging element select specific prohibited behavior conditions corresponding to the specific identification information from the plurality of prohibited behavior conditions stored in the storage element, and produce an alarm when behaviors indicated by the specific prohibited behavior conditions coincide with behaviors indicated by the behavior information.

19 Claims, 20 Drawing Sheets

(56) References Cited

FOREIGN PATENT DOCUMENTS

| | | |
|---|---|---|
| JP | 2004-328018 | 11/2004 |
| JP | 2004-328622 | 11/2004 |
| JP | 2005-196690 | 7/2005 |
| JP | 2005-316945 | 11/2005 |
| JP | 2006-120084 | 5/2006 |
| JP | 2006-146378 | 6/2006 |
| JP | 2006-221355 | 8/2006 |
| JP | 2006-350458 | 12/2006 |
| JP | 2006-350869 | 12/2006 |
| JP | 2007-141184 | 6/2007 |
| JP | 2007-158421 | 6/2007 |

OTHER PUBLICATIONS

International Search Report, PCTJP2008/063052, Oct. 14, 2008.
JP Office Action dated Dec. 11, 2012, with English translation; Application No: 2009-528981.
Office Action issued Mar. 8, 2013 by the Japanese Patent Office in corresponding Japanese Application No. 2009-528981 with partial English translation, three pages.

* cited by examiner

Fig. 9

|  | IDENTIFICATION INFORMATION || PROHIBITED BEHAVIOR CONDITION | BEHAVIOR INFORMATION |
|---|---|---|---|---|
|  | SPECIFIC INFORMATION | FACE IMAGE DATA | | |
| 21-1 | 22-1 | 23-1 | 24-1 | |
| 21-2 | 22-2 | 23-2 | 24-2 | |
|  | ⋮ | ⋮ | ⋮ | |
| 21-9 | 22-9 | 23-9 | 24-9 | |
|  | 22-10 | | | |

20

25

21-10: OUTSIDER IDENTIFICATION INFORMATION
23-10: OUTSIDER FACE IMAGE DATA
24-10: OUTSIDER PROHIBITED BEHAVIOR CONDITION

PERMITTED BEHAVIOR (A AND C BELONG TO SAME GROUP)

PROHIBITED BEHAVIOR (A AND D BELONG TO DIFFERENT GROUPS)

BEHAVIOR MONITORING SYSTEM AND BEHAVIOR MONITORING METHOD

TECHNICAL FIELD

The present invention relates to a behavior or monitoring system and a behavior monitoring method.

BACKGROUND ART

In a business corporation and the like, there is a case that in order to protect secret information, persons are classified into: persons who are permitted in advance to treat the secret information (persons permitted to treat information); and persons who are not permitted in advance to treat the secret information (persons dispermitted to treat information). In this case, the persons dispermitted to treat information are prohibited to enter a room or the like in which the secret information is treated, or the persons dispermitted to treat information are prohibited to approach a rack in which the secret information is stored.

Also, in order to secure safety in a room or an area, there is a case that persons are classified into: persons who are permitted in advance to enter a specific room or area (persons permitted to enter); and persons who are not permitted in advance to enter the specific room or area (persons dispermitted to enter). This case is designed such that, as an entry restriction, whether or not a person is a person permitted to enter is judged based on an IC card, a biometrics authentication or the like, and the person cannot enter the specific room or area when the person is not the person permitted to enter. However, the entry restriction can be applied only to a place in which the specific room or area is surrounded with walls or the like, and the entry can be restricted by a door or the like.

For example, also as for the persons dispermitted to treat information, a case can be demanded that the persons are permitted to enter a room but prohibited to enter a specific area in the room, in which secret information is stored. In this case, the specific area is not separated with walls or the like.

As techniques to detect an invasion (entry) to a specific area or a departure (exit) from the specific area even when there is no wall or the like on the boundary of the specific area as mentioned above, there are an area monitoring system described in Japanese Patent Publication (JP-P2004-328018A) and a safety confirmation system described in Japanese Patent Publication (JP-P2006-350869A). In the technique described in Japanese Patent Publication (JP-P2004-328018A) and the technique described in Japanese Patent Publication (JP-P2006-350869A), by making a to-be-monitored person carry a portable terminal having a function to detect position information, such as GPS, the position of the to-be-monitored person is grasped. Then, the invasion to the specific area is detected based on the position of the to-be-monitored person.

Also, as another technique, there is a security system described in Japanese Patent Publication (JP-A-Showa 62-245399). In this technique, a person who is permitted to enter a security area (a person permitted to enter) is made to carry an IC card, it is judged whether or not the person is the person permitted to enter when the entry of the person to the security area is detected, and an alarm is produced when the person is not the person permitted to enter.

Also, there is a case that persons are permitted to enter different areas depending on the persons. As a technique for such case, there is a security system described in Japanese Patent Publication (JP-P2005-196690A). In this technique, a person is specified by using an IC card carried by the person, and whether or not the person is the person permitted to enter is judged based on an authority of the person when the entry of the person to a security area is detected.

Also, there is a case that a specific behavior is prohibited. As a technique for such case, there is a behavioral pattern identifying apparatus described in Japanese Patent Publication (JP-P2004-328622A). In this technique, change in position information of an object in a monitored area is analyzed, and a behavioral pattern is identified as a normal pattern or nor by statistically processing the behavioral pattern.

As the foregoing technique, there is a suspicious person notification system described in Japanese Patent Publication (JP-P2006-120084A). In this technique, whether a visitor is a resident or non-resident is judged based on face authentication, and a behavior of the visitor is analyzed. Here, whether the behavior is a suspicious behavior or not is judged based on whether the behavior satisfies a suspicious behavior condition. An alarm is produced when the non-resident behaves suspiciously.

Also, as another technique, there is an outsider monitoring system described in Japanese Patent Publication (JP-P2007-141184A). In this technique, an identification to which a wireless IC tag is attached is delivered to an outsider who is permitted to enter (outsider permitted to enter), and a plurality of card communication devices carry out wireless communications with the wireless IC tag to monitor a behavior and stay time of the outsider. Thus, a travel of the outsider permitted to enter, who enters a building, is monitored, and when the outsider satisfies a predetermined condition, the outsider is regarded to be behaving suspiciously, images of the outsider are took by a camera in the vicinity and the outsider is notified to a security guard.

DISCLOSURE OF INVENTION

The techniques described in Japanese Patent Publication (JP-P2004-328018A), Japanese Patent Publication (JP-P2006-350869A), Japanese Patent Publication (JP-A-Showa 62-24539) and Japanese Patent Publication (JP-P2005-196690A) are designed to detect only an entry to or exit from a specific area. For this reason, although entering and exiting behaviors can be monitored, specific prohibited behaviors cannot be monitored. Here, as the specific prohibited behaviors, there are a case that, although an entry to a room is permitted, it is prohibited to approach to a place (for example, a fence) in the room, in which secret information is stored, and a case that, although a short stay in a specific place is permitted, a long stay is prohibited, and the like.

In the technique described in Japanese Patent Publication (JP-P2004-328622A), a behavioral pattern is identified as a normal pattern or nor by statistically processing the behavioral pattern. For this reason, the technique cannot cope with a case that a behavior as a to-be-monitored object is different from person to person. Thus, the technique cannot cope with a case that a specific prohibited behavior is different from person to person. Also, in Japanese Patent Publication (JP-P2006-120084A), although there is a description that a behavior of a visitor is analyzed to judge whether or not the behavior satisfies a suspicious behavior condition, there is no concrete description about the suspicious behavior condition. Moreover, in the technique described in Japanese Patent Publication (JP-P2006-120084A), only monitored are whether the behavior is a normal pattern or not and whether the behavior satisfies the suspicious behavior condition. For this reason, the technique cannot cope with a case that a behavior to be monitored is different from person to person. Thus, the technique cannot cope with a case that a specific prohibited behavior is different from person to person.

Also, in the technique described in Japanese Patent Publication (JP-P2007-141184A), whether or not an outsider behaves suspiciously can be judged based on a judgment condition corresponding to a purpose of visit of the outsider. However, this technique cannot monitor a person who is dispermitted to enter, namely, an invader who does not carry identification.

Accordingly, an object of the present invention is to provide a behavior monitoring system and a behavior monitoring method that can produce an alarm for a specific prohibited behavior which is different depending on a to-be-monitored object.

A behavior monitoring system according to the present invention includes storage means, entry monitoring means, behavior monitoring means and behavior judging means. The storage means store a plurality of identification information respectively identifying a plurality of to-be-monitored objects and a plurality of prohibited behavior conditions indicating behaviors respectively prohibited to the plurality of to-be-monitored objects in an area. The entry monitoring means monitor as specific to-be-monitored objects, to-be-monitored objects which enter the area, and judge whether or not specific identification information identifying the specific to-be-monitored objects exists in the plurality of identification information stored in the storage means. When identification information coincident with the specific identification information exists in the plurality of identification information, the behavior monitoring means monitor based on the specific identification information, the specific to-be-monitored objects which behave in the area, and generate behavior information indicating behaviors of the specific to-be-monitored objects. The behavior judging means select specific prohibited behavior conditions corresponding to the specific identification information from the plurality of prohibited behavior conditions stored in the storage means, and produce an alarm when behaviors indicated by the specific prohibited behavior conditions coincide with behaviors indicated by the behavior information.

BRIEF DESCRIPTION OF DRAWINGS

The above-mentioned object, advantages and features of the present invention will be more apparent from the descriptions of exemplary embodiments in conjunction with the attached drawings in which:

FIG. 9 shows a database 20 of the behavior monitoring system according to the fourth exemplary embodiment of the present invention;

BEST MODE FOR CARRYING OUT THE INVENTION

A behavior monitoring system according to exemplary embodiments of the present invention will be described below in detail with reference to the attached drawings.

First Exemplary Embodiment

Figure 1:
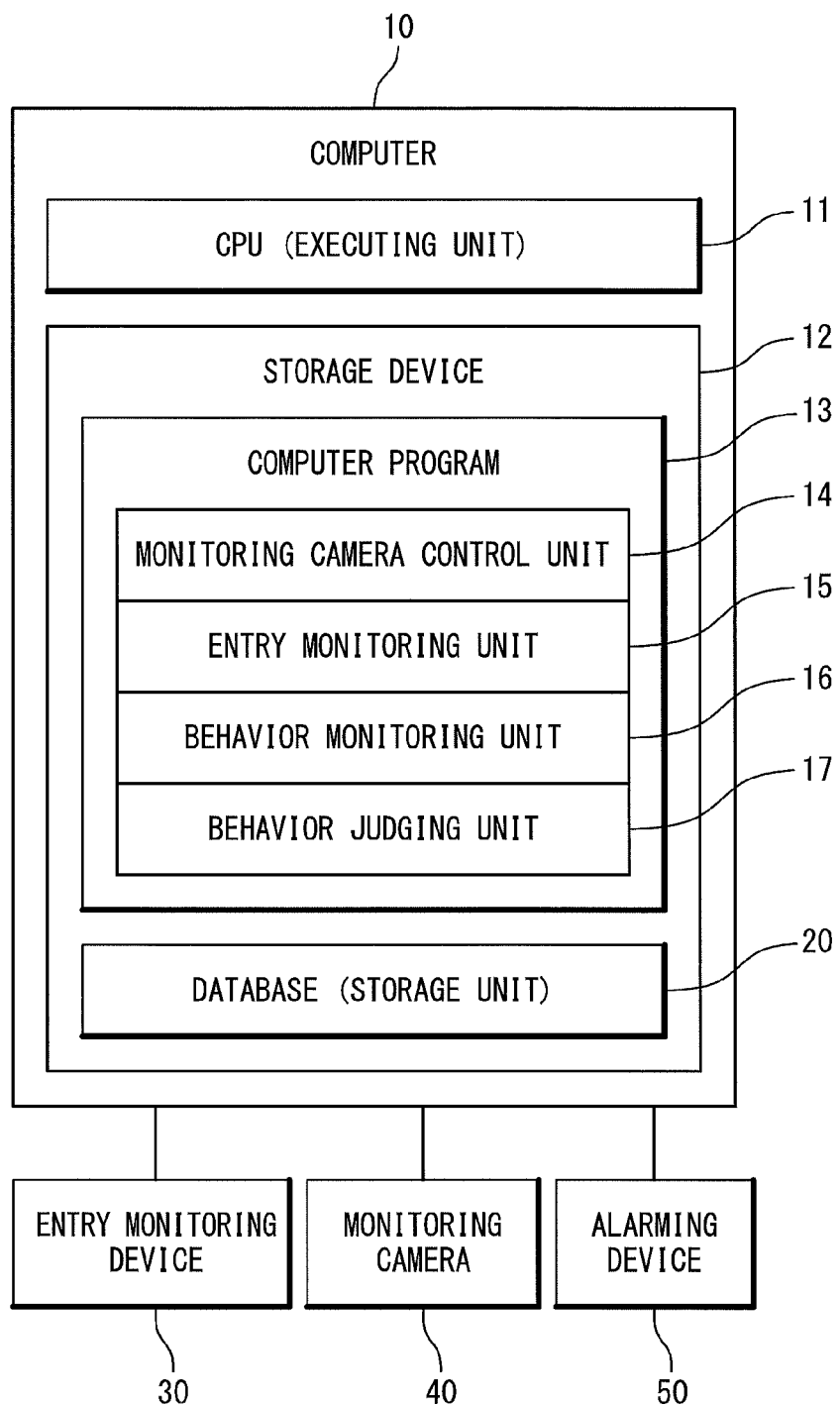
FIG. 1 shows a configuration of a behavior monitoring system according to a first exemplary embodiment of the present invention.

FIG. 1 shows a configuration of a behavior monitoring system according to a first exemplary embodiment of the present invention. The behavior monitoring system according to the first exemplary embodiment of the present invention contains a computer 10, an entry monitoring device 30, a monitoring camera 40 and an alarming device 50. The computer 10 is connected to the entry monitoring device 30, the monitoring camera 40 and the alarming device 50.

The computer 10 contains an executing unit 11 as a CPU and a storage device 12 as a recording medium. The storage device 12 stores a computer program 13 to be executed by the computer 10. At a startup or the like, the executing unit 11 reads the computer program 13 from the storage device 12 and executes the computer program 13. The computer program 13 includes a monitoring camera control unit (monitoring camera control means) 14, an entry monitoring unit (entry monitoring unit) 15, a behavior monitoring unit (behavior monitoring means) 16 and a behavior judging unit (behavior judging means) 17. The storage device 12 contains a database 20 serving as a storage unit (storage means).

The database 20 stores: a plurality of identification information respectively identifying a plurality of to-be-monitored objects; and a plurality of prohibited behavior conditions indicating behaviors that are respectively prohibited to the plurality of to-be-monitored objects in an area.

The monitoring camera control unit 14 controls the monitoring camera 40 to take images of the area and generate dynamic image data indicating a dynamic image of the area.

The entry monitoring unit 15 controls the entry monitoring device 30, which will be described later, to monitor a to-be-monitored object, which enters the area, as a specific to-be-monitored object. The entry monitoring unit 15 refers to the database 20 to judge whether or not specific identification information identifying the specific to-be-monitored object exists in the plurality of identification information.

When identification information coincident with the specific identification information exists in the plurality of identification information, the behavior monitoring unit 16 monitors based on the specific identification information and the dynamic image data, the specific to-be-monitored object that behaves in the area. The behavior monitoring unit 16 generates behavior information indicating a behavior of the specific to-be-monitored object.

The behavior judging unit 17 refers to the database 20 to select from the plurality of prohibited behavior conditions, a specific prohibited behavior condition which corresponds to the specific identification information. When a behavior indicated by the specific prohibited behavior information coincides with a behavior indicated by the behavior information, the behavior judging unit 17 uses the alarming device 50 to produce alarm.

Figure 2:
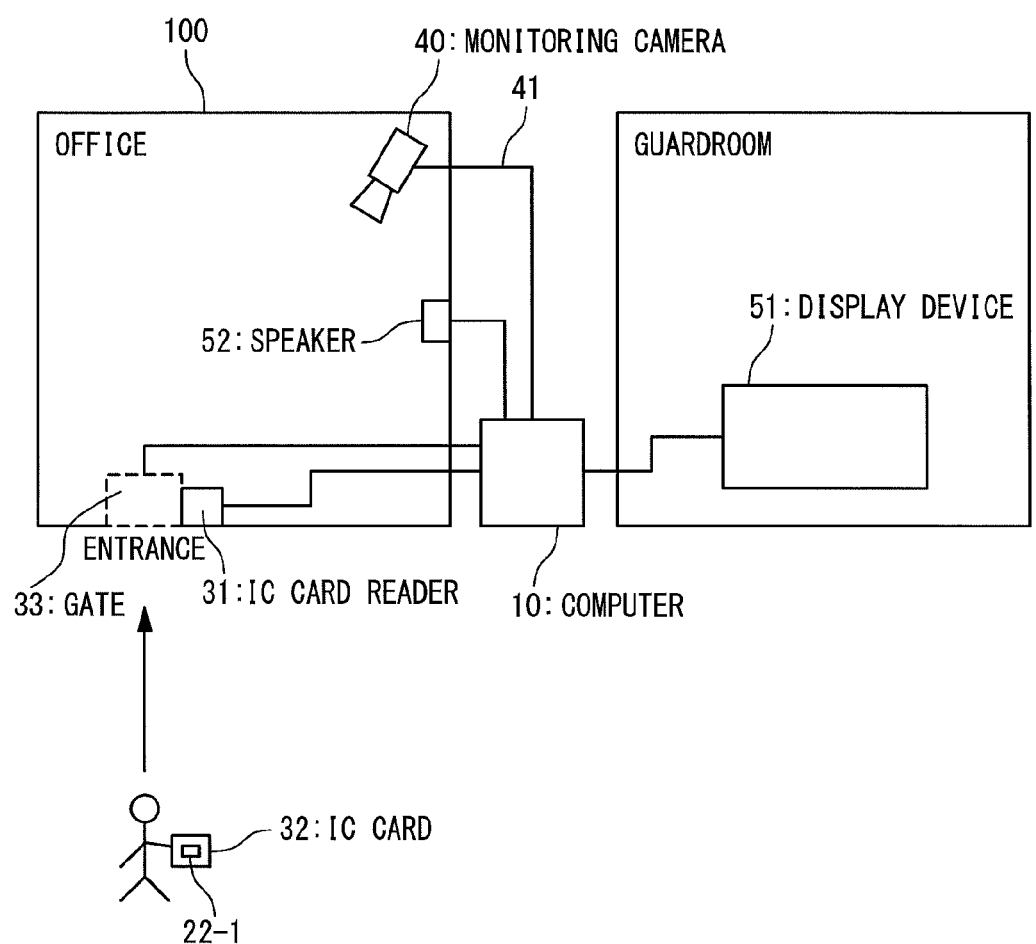
FIG. 2 shows a concrete example of the behavior monitoring system according to the first exemplary embodiment of the present invention.

FIG. 2 shows a concrete example of the behavior monitoring system according to the first exemplary embodiment of the present invention.

The foregoing plurality of to-be-monitored objects are referred to as a plurality of to-be-monitored objects "A to J", respectively. Each of the plurality of to-be-monitored objects "A to J" is a person and carries/possesses an IC card 32 serving as a holding unit in which specific information of oneself is held. The entry monitoring device 30 is assumed to be an IC card reader serving as a communication unit. The specific information held in each IC card 32 of the plurality of to-be-monitored objects "A to J" can be read by the IC card reader 31. The IC card reader 31 is provided at an entrance of an area 100 in order to monitor the to-be-monitored object that enters the area 100. The area 100 is assumed to be an office. The holding unit and the communication unit may be an RFID tag and a reader writer, respectively.

The monitoring camera 40 is provided in the area 100. The monitoring camera 40 takes images of the area 100.

The alarming device 50 includes, for example, a display device 51 provided in a guardroom and a speaker 52 provided in the area 100.

The plurality of to-be-monitored objects "A to J" are permitted to enter the area 100. To-be-monitored objects (outsiders) other than the plurality of to-be-monitored objects "A to J" are refused to enter the area 100. In order to realize this, a gate 33 is provided at the entrance of the area 100.

Figure 3:
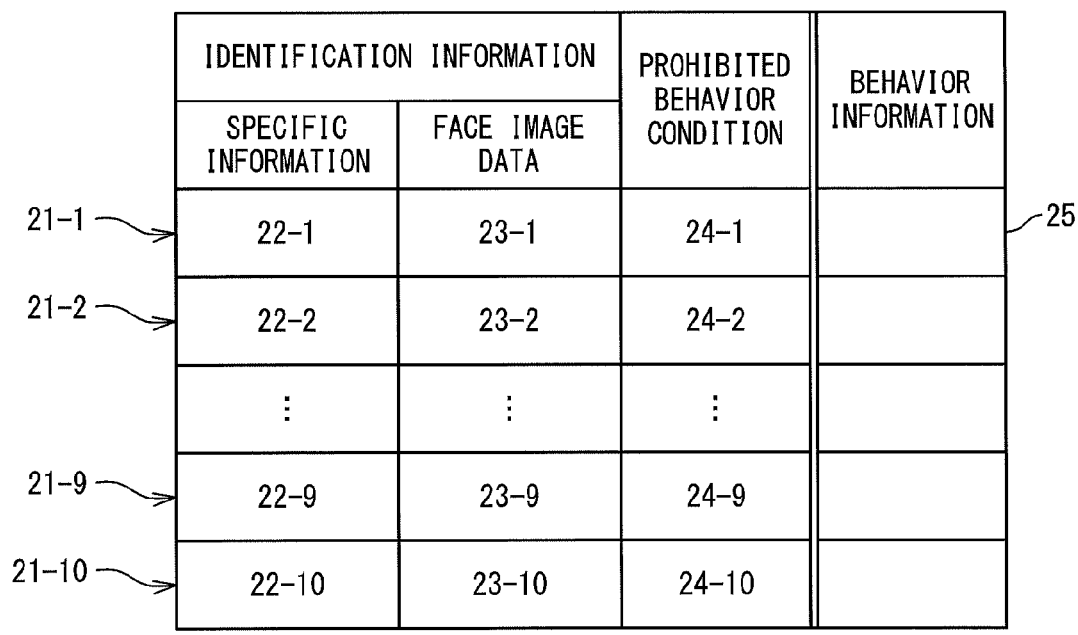
FIG. 3 shows a database 20 of the behavior monitoring systems according to the first to third exemplary embodiments of the present invention.

FIG. 3 shows the database 20.

The foregoing plurality of identification information stored in the database 20 are referred to as a plurality of identification information 21-1 to 21-10. The plurality of identification information 21-1 to 21-10 are identifiers to respectively identify the plurality of to-be-monitored objects "A to J". The plurality of identification information 21-1 to 21-10 include: a plurality of specific information 22-1 to 22-10 indicating the plurality of to-be-monitored objects "A to J"; and a plurality of face image data 23-1 to 23-10 indicating face images of the plurality of to-be-monitored objects "A to J", respectively.

The foregoing plurality of prohibited behavior conditions stored in the database 20 are referred to as a plurality of prohibited behavior conditions 24-1 to 24-10. The plurality of prohibited behavior conditions 24-1 to 24-10 indicate behaviors prohibited to the plurality of to-be-monitored objects "A to J" in the area 100, respectively.

Operations of the behavior monitoring system according to the first exemplary embodiment of the present invention are classified into an image-taking operation and a monitoring operation.

Figure 4:
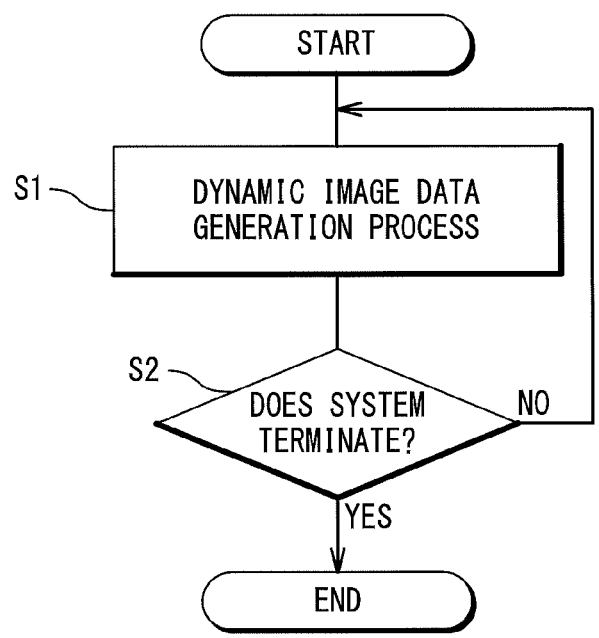
FIG. 4 is a flowchart of an image-taking operation as an operation of the behavior monitoring systems according to the first to fourth exemplary embodiments of the present invention.

FIG. 4 is a flowchart showing the image-taking operation.

The monitoring camera control unit 14 executes a dynamic image data generation process for controlling the monitoring camera 40. Specifically, the monitoring camera control unit 14 transmits an image-taking start instruction to the monitoring camera 40, for example, when the startup of the computer 10 is executed. The monitoring camera 40 takes images of the area 100 in response to the image-taking start instruction and generates static image data indicating a static image of the area 100 (Step S1). The monitoring camera control unit 14 transmits an image-taking termination instruction to the monitoring camera 40, for example, when the startup of the computer 10 is finished. The monitoring camera 40 terminates the image-taking operation in response to the image-taking termination instruction (Step S2—YES). The monitoring camera 40 executes the step S1, when the monitoring camera 40 does not receive the image-taking termination instruction (Step S2—NO). In this way, the monitoring camera 40 generates a plurality of static image data by periodically executes the step S1. Consequently, the monitoring camera 40 generates a dynamic image data 41, which indicates a dynamic image of the area 100, from the plurality of static image data (refer to FIG. 2).

Figure 5:
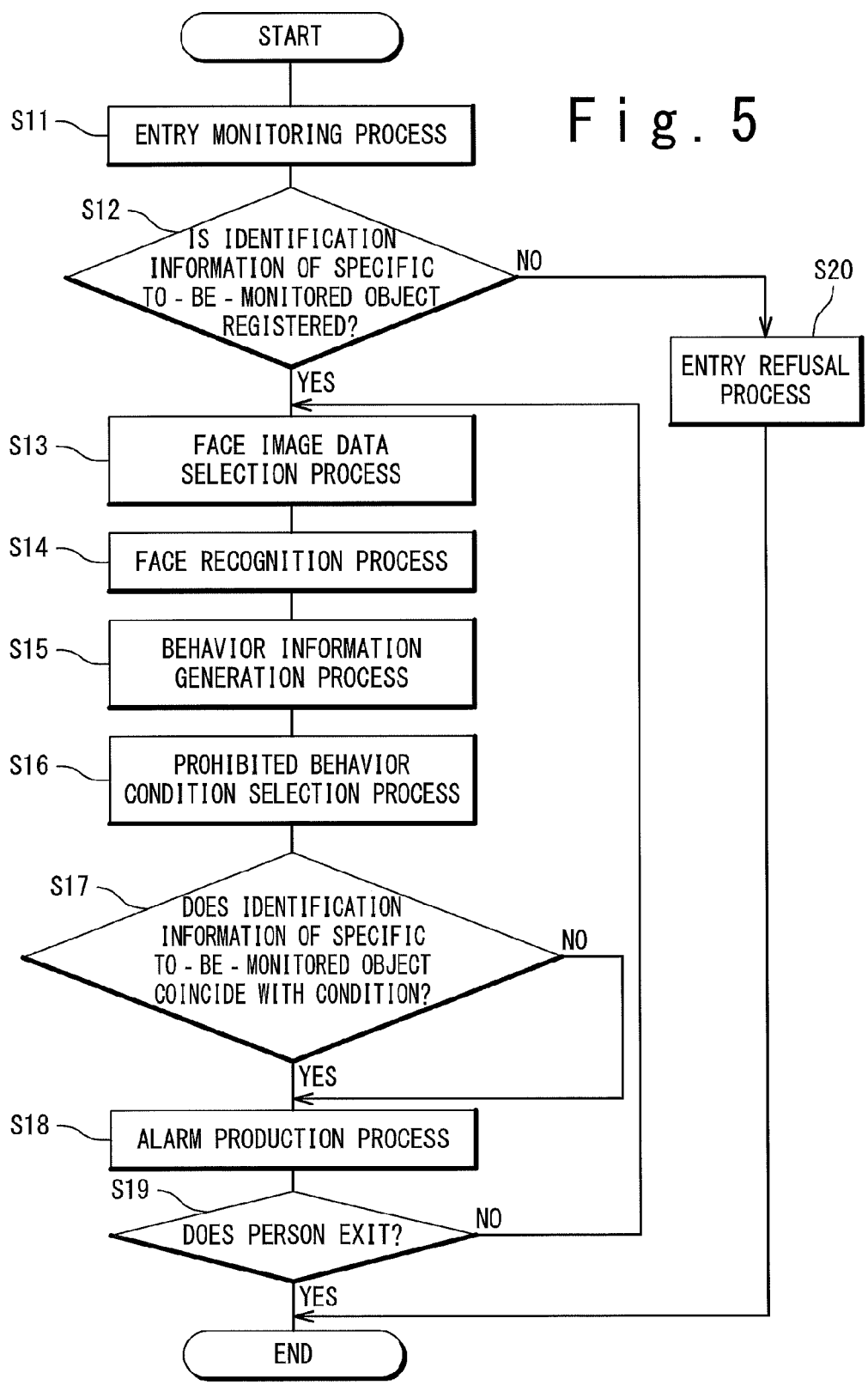
FIG. 5 is a flowchart showing a monitoring operation as an operation of the behavior monitoring systems according to the first to third exemplary embodiments of the present invention.

FIG. 5 is a flowchart showing the monitoring operation.

The entry monitoring unit 15 controls the IC card reader 31 to execute an entry monitoring process for monitoring a to-be-monitored object, which enters the area 100, as a specific to-be-monitored object. Specifically, for example, when the startup of the computer 10 is executed, the entry monitoring unit 15 transmits an entry monitoring instruction to the IC card reader 31. In response to the entry monitoring instruction, the IC card reader 31 communicates with IC cards capable of communication in a predetermined communication area. For example, when the specific to-be-monitored object "A" enters the area 100, the IC card reader 31 communicates with the IC card 32 of the specific to-be-monitored object "A". At this time, the IC card reader 31 reads the specific information 22-1 of the specific to-be-monitored object "A" from the IC card 32 of the specific to-be-monitored object "A" (Step S11).

The entry monitoring unit 15 refers to the database 20 to judge whether or not the specific information 22-1 of the specific to-be-monitored object "A" exists in the plurality of specific information 22-1 to 22-10 (Step S12).

Here, specific information coincident with the specific information 22-1 of the specific to-be-monitored object "A" exists in the plurality of specific information 22-1 to 22-10 (Step S12—YES). In this case, the behavior monitoring unit 16 refers to the database 20 to select, from the plurality of face image data 23-1 to 23-10, the selected face image data 23-1 corresponding to the specific information 22-1 of the specific to-be-monitored object "A" (Step S13).

The behavior monitoring unit 16 executes a face recognition process, in order to monitor the specific to-be-monitored object "A" that behaves in the area 100. In the face recognition process, the behavior monitoring unit 16 judges whether or not the face image indicated by the selected face image data 23-1 is included in the dynamic image indicated by the dynamic image data 41 (Step S14). The face recognition process can be implemented, for example, by using feature points. Since the face recognition process is public, detailed description of that is omitted.

The dynamic image indicated by the dynamic image data 41 includes the face image indicated by the selected face image data 23-1. In this case, the behavior monitoring unit 16 refers to the database 20 to execute matching between the specific to-be-monitored object "A" that is specified by the entry monitoring unit 15 based on the specific information 22-1 and the specific to-be-monitored object "A" that is specified by the behavior monitoring unit 16 based on the selected face image data 23-1. Consequently, the behavior monitoring unit 16 generates a behavior of the specific to-be-monitored object "A", which is included in the dynamic image indicated by the dynamic image data 41, as behavior information 25 (Step S15). At this time, the behavior monitoring unit 16 stores the behavior information 25 in the database 20 such that the behavior information 25 is correlated to the specific identification information 21-1 (the specific information 22-1 and the selected face image data 23-1).

The behavior judging unit 17 refers to the database 20 to select, from the plurality of prohibited behavior conditions 24-1 to 24-10, the specific prohibited behavior condition 24-1 corresponding to the specific identification information 21-1 (Step S16).

When the behavior indicated by the specific prohibited behavior condition 24-1 coincides with the behavior indicated by the behavior information 25 (Step S17—YES), the behavior judging unit 17 produces an alarm (Step S18). In this case, the behavior judging unit 17 notifies a security guard in the guardroom by displaying the dynamic image data 41 on the display device 51 and by displaying the content of the specific prohibited behavior condition 24-1 as a text on the display device 51. Also, the behavior judging unit 17 notifies the specific to-be-monitored object "A" by outputting the content of the specific prohibited behavior condition 24-1 as sound from the speaker.

As mentioned above, the dynamic image data includes the plurality of static image data. For this reason, the foregoing steps S13 to S18 are performed on one static image data among the plurality of static image data. When the specific to-be-monitored object "A" does not exit from the area 100 (Step S19—NO), the foregoing steps S13 to S18 are performed on the next static image data to the one static image data among the plurality of static image data. When the specific to-be-monitored object "A" exits from the area 100, the monitoring operation for the specific to-be-monitored object "A" is terminated (Step S19—YES).

Here, it is assumed that the specific to-be-monitored object is not the specific to-be-monitored object "A" and there is no specific information of the specific to-be-monitored object (Step S12—NO). In this case, the entry monitoring unit 15 executes an entry refusal process in which the gate 33 is controlled to refuse the entry of the specific to-be-monitored object to the area 100. Specifically, the specific information of the specific to-be-monitored object does not exist in the plurality of specific information 22-1 to 22-10. Or, since the specific information of the specific to-be-monitored object does not exist, the IC card reader 31 cannot read the specific information of the specific to-be-monitored object. In this case, the entry monitoring unit 15 transmits an entry refusal instruction to the gate 33. The gate 33 closes the entrance of the area 100 in response to the entry refusal instruction and refuses the entry of the specific to-be-monitored object to the area 100 (Step S20).

According to the behavior monitoring system according to the first exemplary embodiment of the present invention, when a specific to-be-monitored object enters the area 100, a behavior of the specific to-be-monitored object is monitored. When the behavior of the specific to-be-monitored object is a prohibited behavior, an alarm is produced. The prohibited behavior is different depending on the to-be-monitored object. For this reason, the alarm can be produced for the specific prohibited behavior that is different depending on the to-be-monitored object.

Second Exemplary Embodiment

As for a second exemplary embodiment, the descriptions overlapping with the first exemplary embodiment are omitted.

Figure 6:
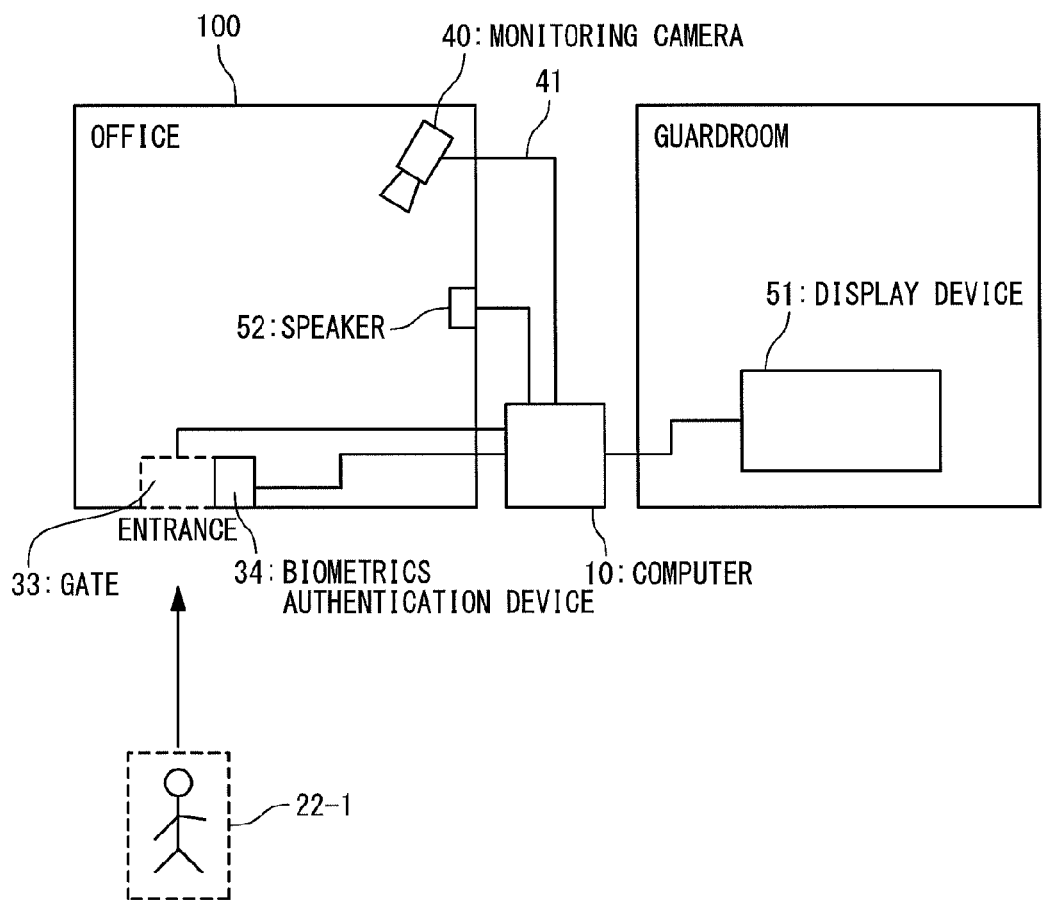
FIG. 6 shows a concrete example of the behavior monitoring system according to the second exemplary embodiment of the present invention.

FIG. 6 shows a concrete example of a behavior monitoring system according to the second exemplary embodiment of the present invention.

Each of the plurality of to-be-monitored objects "A to J" is a person and holds specific information of oneself. The specific information of each of the plurality of to-be-monitored objects "A to J" indicates at least one biometrics of a fingerprint, an iris, a voiceprint and handwriting. The entry monitoring device 30 is not the IC card reader 31 but a biometrics reader 34. The specific information of each of the plurality of to-be-monitored objects "A to J" is readable by the biometrics reader 34. The biometrics reader 34 contains a reading unit (not shown) to read the specific information. The biometrics reader 34 is provided at the entrance of the area 100, in order to monitor the to-be-monitored object that enters the area 100.

Operations of the behavior monitoring system according to the second exemplary embodiment of the present invention are classified into an image-taking operation and a monitoring operation.

The image-taking operation is same as the image-taking operation of the first exemplary embodiment.

The monitoring operation differs from the first exemplary embodiment, only with regard to the step S11.

The entry monitoring unit 15 controls the biometrics reader 34 to execute an entry monitoring process for monitoring a to-be-monitored object, which enters the area 100, as a specific to-be-monitored object. Specifically, for example, when the startup of the computer 10 is executed, the entry monitoring unit 15 transmits an entry monitoring instruction to the biometrics reader 34. In response to the entry monitoring instruction, the biometrics reader 34 guides, through displaying or sound, for example, the to-be-monitored object which enters the area 100 to input specific information of oneself to the reading unit. For example, when the specific to-be-monitored object "A" enters the area 100, the specific to-be-monitored object "A" inputs specific information 22-1 of oneself to the reading unit. At this time, the biometrics reader 34 reads the specific information 22-1 of the specific to-be-monitored object "A" through the reading unit (Step S11).

The steps S12 to S20 are same as the steps S12 to S20 of the first exemplary embodiment.

According to the behavior monitoring system according to the third exemplary embodiment of the present invention, the same advantages as the first exemplary embodiment are provided.

Third Exemplary Embodiment

As for a third exemplary embodiment, the descriptions overlapping with the first and second exemplary embodiments are omitted.

Figure 7:
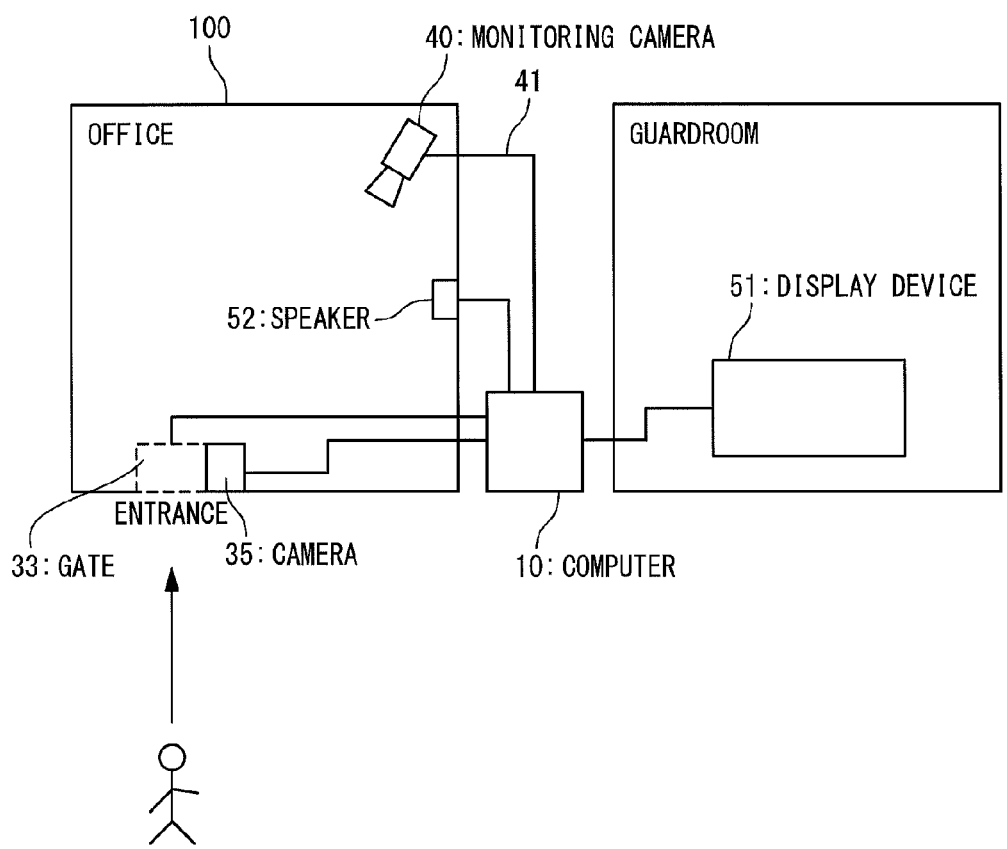
FIG. 7 shows a concrete example of the behavior monitoring system according to the third exemplary embodiment of the present invention.

FIG. 7 shows a concrete example of a behavior monitoring system according to the third exemplary embodiment of the present invention.

Each of the plurality of to-be-monitored objects "A to J" is a person. The entry monitoring device 30 is neither the IC card reader 31 nor the biometrics reader 34 but a camera 35. The camera 35 is provided at the entrance of the area 100 in order to monitor the to-be-monitored object that enters the area 100. The camera 35 may be identical to the monitoring camera 40.

The third exemplary embodiment does not require the plurality of specific information 22-1 to 22-10 stored in the database 20. In this case, the plurality of specific information 22-1 to 22-10 may be used as information to manage the plurality of to-be-monitored objects "A to J".

Operations of the behavior monitoring system according to the third exemplary embodiment of the present invention are classified into an image-taking operation and a monitoring operation.

The image-taking operation is same as the image-taking operation of the first exemplary embodiment.

The monitoring operation differs from the first exemplary embodiment, with regard to the steps S11 to S13.

The entry monitoring unit 15 controls the camera 35 to execute an entry monitoring process for monitoring a to-be-monitored object, which enters the area 100, as a specific to-be-monitored object. Specifically, for example, when the startup of the computer 10 is executed, the entry monitoring unit 15 transmits an entry monitoring instruction to the camera 35. In response to the entry monitoring instruction, the camera 35 takes images of the to-be-monitored object that enters the area 100 as the specific to-be-monitored object by taking images of the entrance of the area 100. At this time, the camera 35 generates image data indicating an image including a face image of the specific to-be-monitored object. For example, when the specific to-be-monitored object "A" enters the area 100, the camera 35 takes images of the specific to-be-monitored object "A" that enters the area 100, and the camera 35 generates image data indicating an image including a face image of the specific to-be-monitored object "A" (Step S11).

The entry monitoring unit 15 refers to the database 20 to judge whether or not face image data indicating face image of the specific to-be-monitored object "A" exists in the plurality of face image data 23-1 to 23-10 (Step S12).

Here, the face image data indicating the face image coincident with the face image of the specific to-be-monitored object "A" exists in the plurality of face image data 23-1 to 23-10 (Step S12—YES). In this case, the behavior monitoring unit 16 refers to the database 20 to select the face image data as the selected face image data 23-1 (Step S13).

The steps S14 to S20 are same as the steps S12 to S20 of the first exemplary embodiment.

According to the behavior monitoring system according to the second exemplary embodiment of the present invention, the same advantages as the first exemplary embodiment are provided.

Fourth Exemplary Embodiment

As for a fourth exemplary embodiment, the descriptions overlapping with the third exemplary embodiment are omitted.

Figure 8:
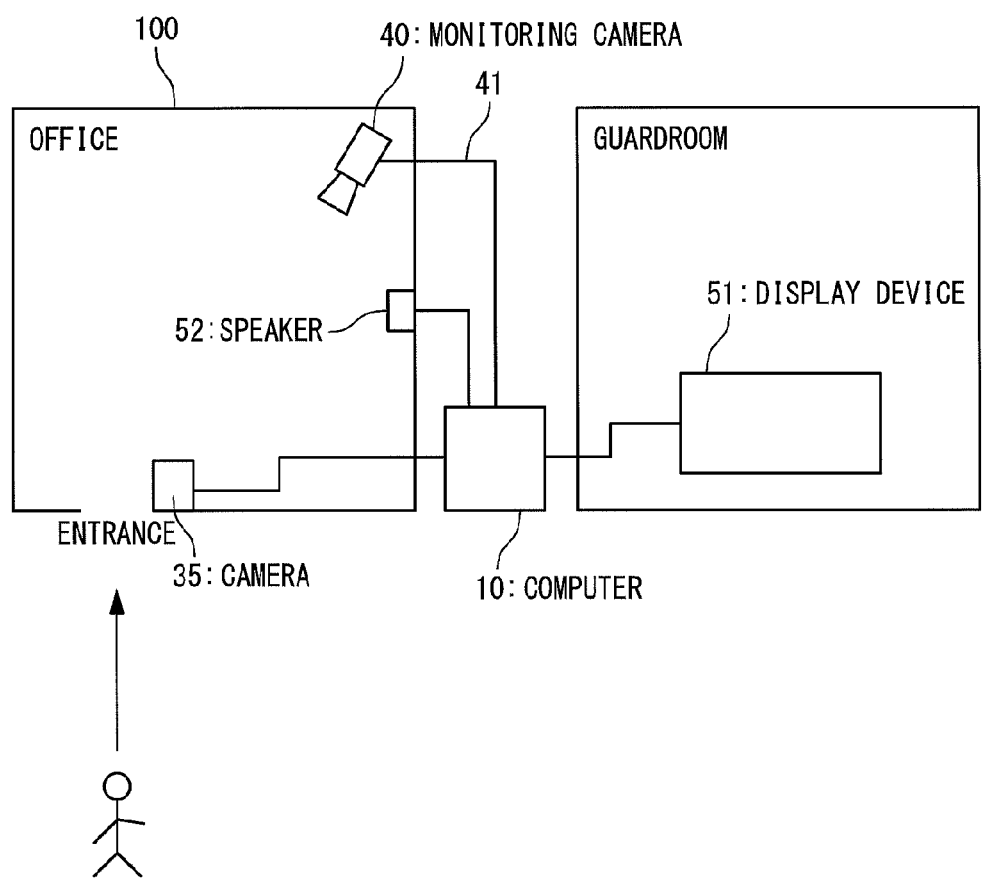
FIG. 8 shows a concrete example of the behavior monitoring system according to the fourth exemplary embodiment of the present invention.

FIG. 8 shows a concrete example of a behavior monitoring system according to the fourth exemplary embodiment of the present invention.

In the third exemplary embodiment, the gate 33 is provided at the entrance of the area 100. However, in the fourth exemplary embodiment, the gate 33 is not provided. The plurality of to-be-monitored objects "A to J" are permitted to enter the area 100. Here, the to-be-monitored object "J" is assumed to be an outsider. That is, in the fourth exemplary embodiment, there is no entry restriction.

FIG. 9 shows the database 20.

A prohibited behavior condition 24-10 as one of the plurality of prohibited behavior conditions 24-1 to 24-10 stored in the database 20 is an outsider prohibited-behavior condition indicating a behavior that is prohibited to the to-be-monitored object "J". When the to-be-monitored object "J" enters the area 100, outsider face image data 23-10, which will be described later, is stored in the database 20 such that the outsider face image data 23-10 is correlated to the prohibited behavior condition 24-10.

Operations of the behavior monitoring system according to the fourth exemplary embodiment of the present invention are classified into an image-taking operation and a monitoring operation.

The image-taking operation is same as the image-taking operation in the third exemplary embodiment.

Figure 10:
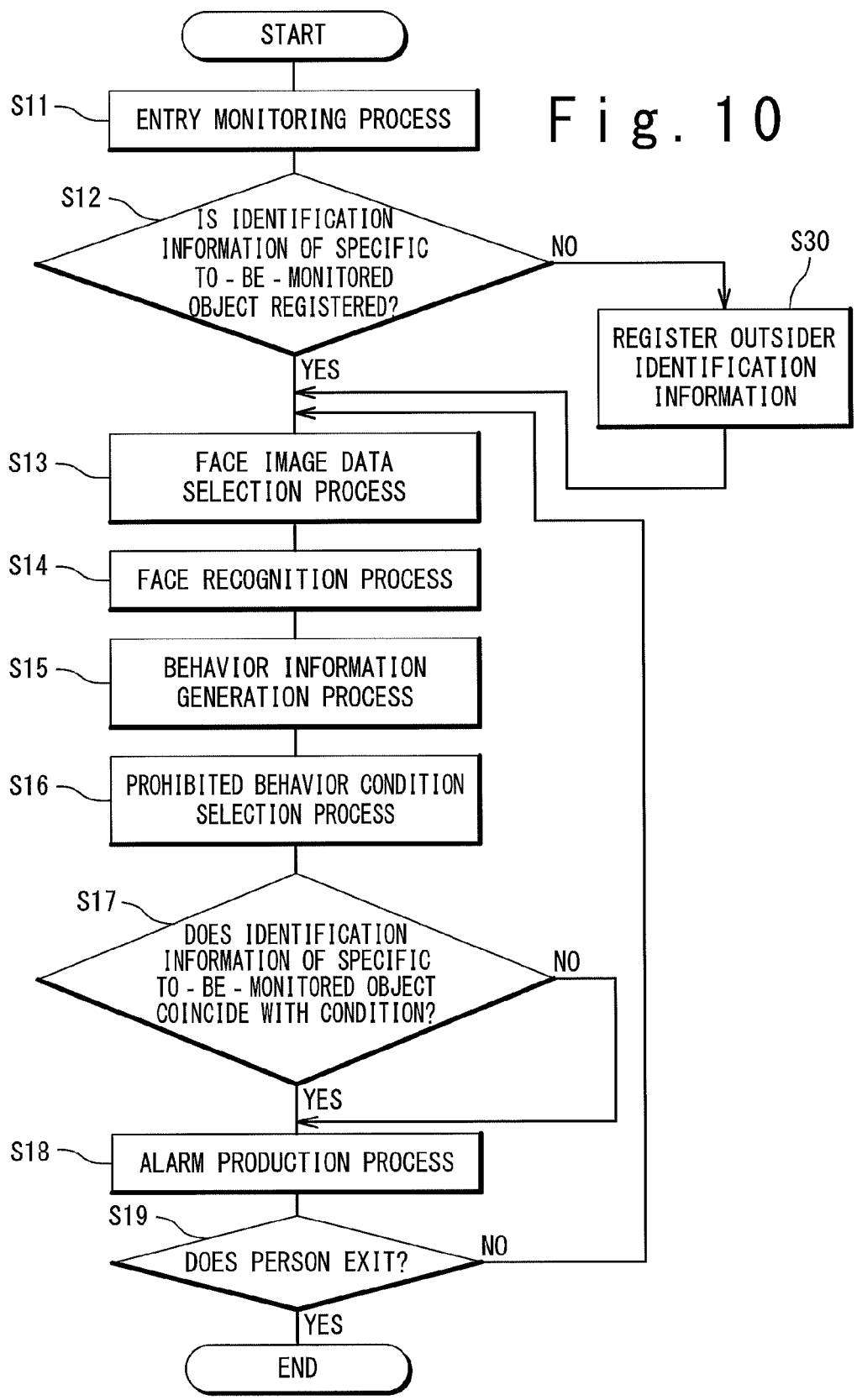
FIG. 10 is a flowchart showing a monitoring operation as an operation of the behavior monitoring system according to the fourth exemplary embodiment of the present invention.

FIG. 10 is a flowchart showing the monitoring operation. In the monitoring operation, a step S30 is executed instead of the step S20, differently from the third exemplary embodiment.

The entry monitoring unit 15 controls the camera 35 to take images of the to-be-monitored object "J", which enters the area 100, as a specific to-be-monitored object and generate image data indicating an image including face image which includes a face image of the specific to-be-monitored object (Step S11).

The entry monitoring unit 15 refers to the database 20 to judge whether or not face image data indicating face image of the specific to-be-monitored object "J" exists in the plurality of face image data 23-1 to 23-10 (Step S12).

Here, the face image data indicating the face image coincident with the face image of the specific to-be-monitored object "J" does not exist in the plurality of face image data 23-1 to 23-10 (Step S12—NO). That is, face image data indicating a face image of the specific to-be-monitored object "J" is not stored in the database 20. In this case, the entry monitoring unit 14 stores in the database 20, the outsider face image data 23-10 indicating the face image of the specific to-be-monitored object "J" as the outsider identification information 21-10 to identify the outsider such that the outsider face image data 23-10 is correlated to the outsider prohibited-behavior condition 24-10 (Step S30).

The behavior monitoring unit 16 executes a face recognition process in order to monitor the specific to-be-monitored object "J" that behaves in the area 100. In the face recognition process, the behavior monitoring unit 16 judges whether or not the face image indicated by the outsider face image data 23-10 is included in the dynamic image indicated by the dynamic image data 41 (Steps S13 and S14).

The face image indicated by the outsider face image data 23-10 is included in the dynamic image indicated by the dynamic image data 41. In this case, the behavior monitoring unit 16 refers to the database 20 to execute matching between the specific to-be-monitored object "J" that is specified by the entry monitoring unit 15 based on the specific information 22-10 and the specific to-be-monitored object "J" that is specified by the behavior monitoring unit 16 based on the selected face image data 23-10. Consequently, the behavior monitoring unit 16 generates a behavior of the specific to-be-monitored object "J", which is included in the dynamic image indicated by the dynamic image data 41, as behavior information 25 (Step S15). At this time, the behavior monitoring unit 16 stores the behavior information 25 in the database 20 such that the behavior information 25 is correlated to the specific identification information 21-10 (the outsider face image data 23-10).

The behavior judging unit 17 refers to the database 20 to select from the plurality of prohibited behavior conditions 24-1 to 24-10, the outsider prohibited-behavior condition 24-10 corresponding to the specific identification information 21-10 (Step S16).

When the behavior indicated by the outsider prohibited-behavior condition 24-10 coincides with the behavior indicated by the behavior information 25 (Step S17—YES), the behavior judging unit 17 produces an alarm (Step S18). In this case, the behavior judging unit 17 notifies a security guard in the guardroom by displaying the dynamic image data 41 on the display device 51 and displaying the content of the outsider prohibited-behavior condition 24-10 as a text on the display device 51. Also, the behavior judging unit 17 notifies the specific to-be-monitored object "J" by outputting the content of the outsider prohibited-behavior condition 24-10 as sound from the speaker.

As mentioned above, the dynamic image data includes the plurality of static image data. For this reason, the foregoing steps S13 to S18 are performed on one static image data among the plurality of static image data. When the specific to-be-monitored object "J" does not exit from the area 100 (Step S19—NO), the foregoing steps S13 to S18 are performed on the next static image data to the one static image data among the plurality of static image data. When the specific to-be-monitored object "J" exits from the area 100, the monitoring operation for the specific to-be-monitored object "J" is terminated (Step S19—YES).

According to the behavior monitoring system according to the fourth exemplary embodiment of the present invention, when there is no entry restriction, the specific to-be-monitored object "J" as an outsider can enter the area 100. So, according to the behavior monitoring system according to the fourth exemplary embodiment of the present invention, when the specific to-be-monitored object "J" enters the area 100, the feature (the face image) of the specific to-be-monitored object "J" is newly recorded to monitor a behavior of the specific to-be-monitored object "J". When the behavior of the specific to-be-monitored object is the prohibited behavior, an alarm is produced. The prohibited behavior is different depending on the to-be-monitored object. Hence, without depending on whether the to-be-monitored object is permitted to enter or not, an alarm can be produced for the specific prohibited behavior that is different depending on the to-be-monitored object.

As for the behavior monitoring systems according to the first to fourth exemplary embodiments of the present invention, concrete examples of the plurality of prohibited behavior conditions 24-1 to 24-10 stored in the database 20 will be described.

As shown in FIGS. 11 to 14, it is assumed that the area 100 includes a predetermined region 101.

Figure 11:
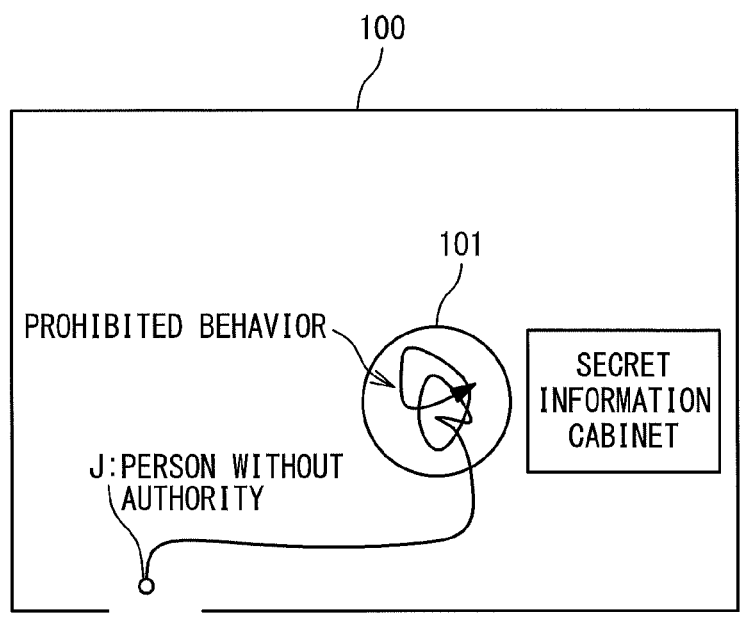
FIG. 11 illustrates operations of the behavior monitoring system according to the first to fourth exemplary embodiments of the present invention.
Figure 13:
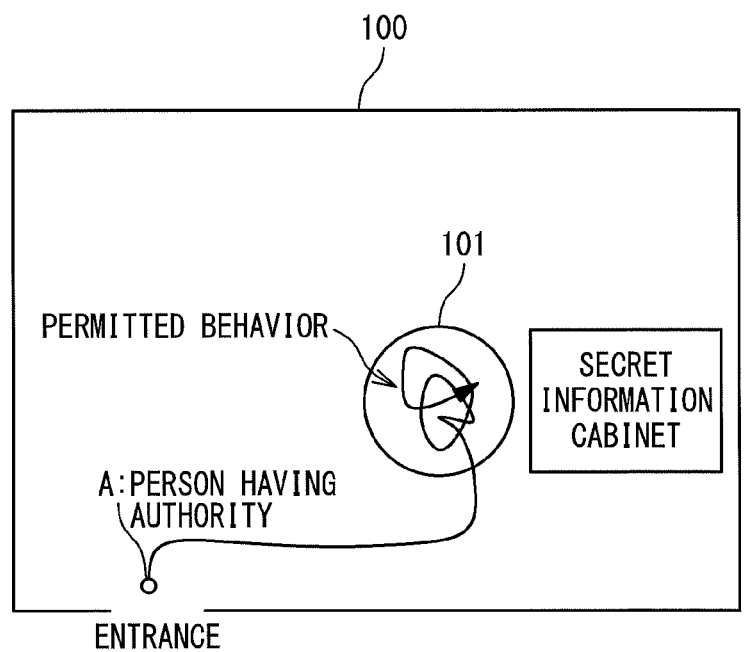
FIG. 13 illustrates operations of the behavior monitoring system according to the first to fourth exemplary embodiments of the present invention.
Figure 14:
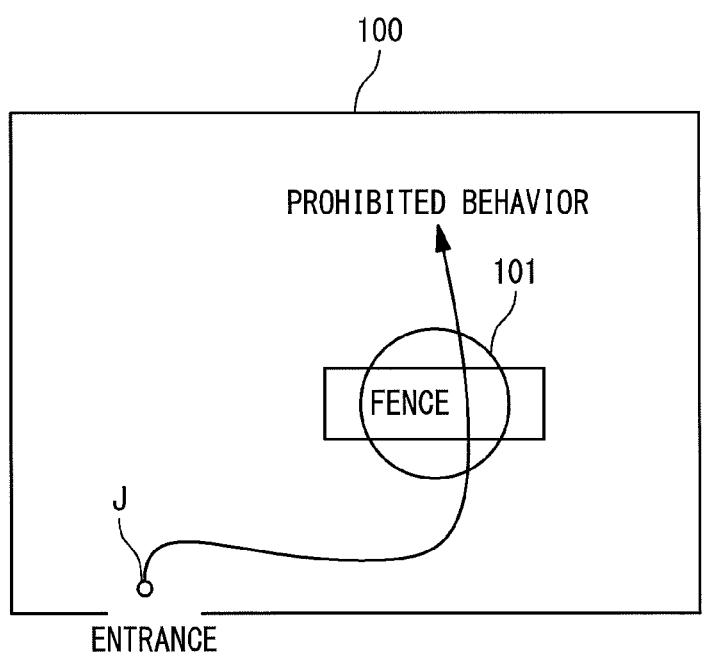
FIG. 14 illustrates operations of the behavior monitoring system according to the first to fourth exemplary embodiments of the present invention.

At first, the plurality of prohibited behavior conditions 24-1 to 24-10 indicate permission or prohibition of entry to the predetermined region 101, for the plurality of to-be-monitored objects "A to J", respectively. For example, as shown in FIG. 11, the prohibited behavior condition 24-10 indicates the prohibition of entry to the predetermined region 101, for the to-be-monitored object "J". For example, as shown in FIG. 14, the prohibition of the entry to the predetermined region 101 may include passing through a place other than a path, such as passing over a fence or the like. As shown in FIG. 13, the prohibited behavior condition 24-1 indicates the permission of the entry to the predetermined region 101, for the to-be-monitored object "A".

Figure 12:
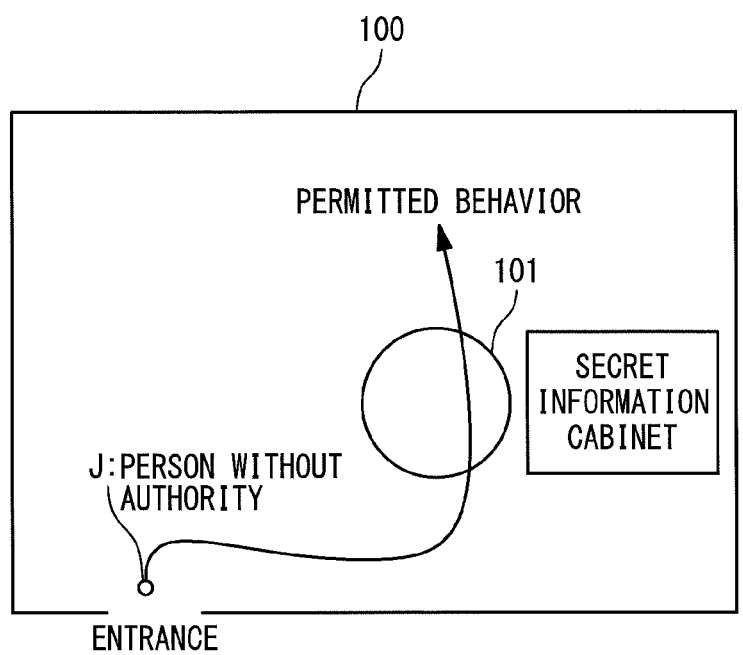
FIG. 12 illustrates operations of the behavior monitoring system according to the first to fourth exemplary embodiments of the present invention.

Also, the plurality of prohibited behavior conditions 24-1 to 24-10 indicate times in which the plurality of to-be-monitored objects "A to J" can stay in the predetermined region 101, respectively. For example, the prohibited behavior condition 24-10 indicates that a time in which the to-be-monitored object "J" can stay in the predetermined region 101 is less than one second. In this case, as shown in FIG. 11, the prohibited behavior condition 24-10 indicates the prohibition of the entry to the predetermined region 101 for one second or more, for the to-be-monitored object "J". As shown in FIG. 12, the prohibited behavior condition 24-10 indicates the permission of the entry to the predetermined region 101 for less than one second, for the to-be-monitored object "J".

The permission of the entry to the predetermined region 101 may be determined based on date or time zone in a day. For example, there is a case that, although the to-be-monitored object "A" is permitted to carry out a work in the predetermined region 101, the to-be-monitored object "A" is required to be prohibited to enter the predetermined region 101 in a purpose other than the work. In this case, it is preferable that the date and time when the to-be-monitored object "A" carries out the work in the predetermined region 101 is determined in advance. For example, the prohibited behavior condition 24-1 indicates the permission of the entry to the predetermined region 101 from 13:00 to 14:00 on July 17, for the specific to-be-monitored object "A".

Figure 15:
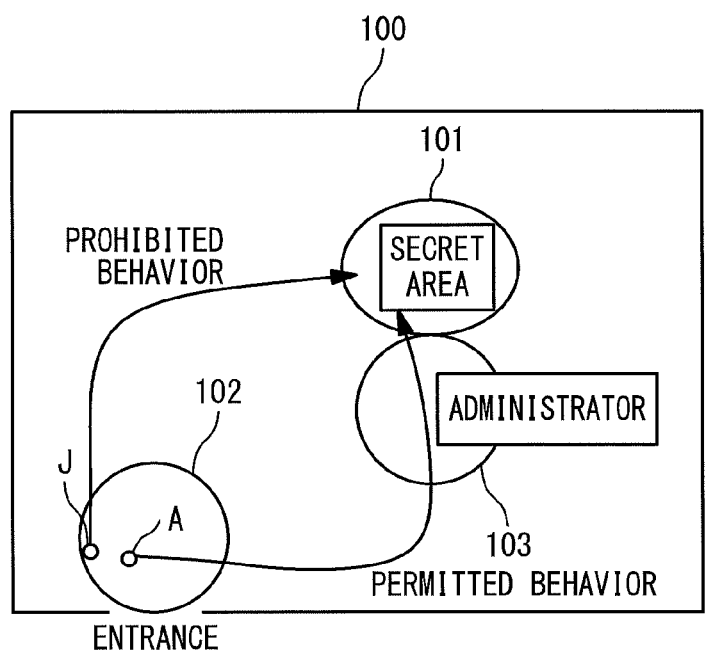
FIG. 15 illustrates operations of the behavior monitoring system according to the first to fourth exemplary embodiments of the present invention.
Figure 16:
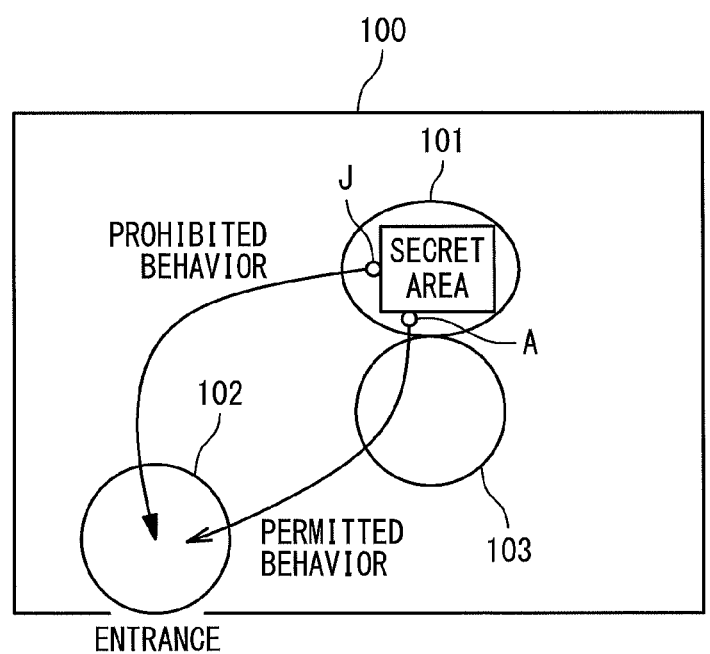
FIG. 16 illustrates operations of the behavior monitoring system according to the first to fourth exemplary embodiments of the present invention.

As shown in FIGS. 15 and 16, it is assumed that the area 100 further includes a plurality of regions 102 and 103. It is assumed that the region 102 is set at the entrance of the area 100 and the region 103 is set near the predetermined region 101. The plurality of prohibited behavior conditions 24-1 to 24-10 respectively indicate for entry-permitted to-be-monitored object group "A to E", orders for passing through the plurality of regions 102 and 103 in entering and leaving the predetermined region 101.

For example, as shown in FIG. 15, the plurality of prohibited behavior conditions 24-1 to 24-10 respectively permit the entry-permitted to-be-monitored object group "A to E" to enter the predetermined region 101 when they pass through the regions 102 and 103 in this order. The plurality of prohibited behavior conditions 24-1 to 24-10 respectively prohibit the entry-permitted to-be-monitored object group "A to E" to enter the predetermined region 101 when they do not pass through the regions 102 and 103 in this order.

For example, as shown in FIG. 16, the plurality of prohibited behavior conditions 24-1 to 24-10 respectively permit the entry-permitted to-be-monitored object group "A to E" to leave the predetermined region 101 when they exits the predetermined region 101 and pass through the region 103. The plurality of prohibited behavior conditions 24-1 to 24-10 respectively prohibit the entry-permitted to-be-monitored object group "A to E" to leave the predetermined region 101 when they do not pass through the region 103 after exiting the predetermined region 101.

As shown in FIGS. 17 to 22, it is assumed that a plurality of specific to-be-monitored objects exist. The plurality of specific to-be-monitored objects are referred to as, for example, specific to-be-monitored objects "A to D". The plurality of prohibited behavior conditions 24-1 to 24-10 indicate interrelationships for the plurality of specific to-be-monitored objects "A to D", respectively.

Figure 17:
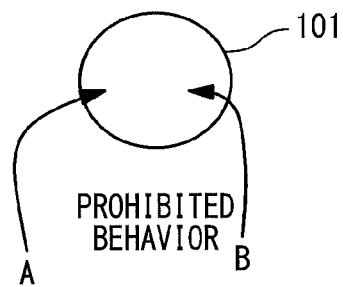
FIG. 17 illustrates operations of the behavior monitoring system according to the first to fourth exemplary embodiments of the present invention.

As shown in FIG. 17, a first specific to-be-monitored object and a second specific to-be-monitored object among the plurality of specific to-be-monitored objects are referred to as a specific to-be-monitored object "A" and a specific to-be-monitored object "B", respectively. In this case, the foregoing interrelationship indicates that the specific to-be-monitored object "A" and the specific to-be-monitored object "B" approach to one another such that a distance between them is shorter than a predetermined distance. Then, the prohibited behavior conditions 24-1 and 24-2 prohibit that the distance between the specific to-be-monitored object "A" and the specific to-be-monitored object "B" is shorter than the predetermined distance, for the specific to-be-monitored object group "A and B", respectively. There is a case that a plurality of departments are accommodated in an office and information exchange is prohibited between specific departments. In such a case, by prohibiting a person to approach to a person of target department within a distance shorter than the predetermined distance, information can be prevented from being exchanged between the specific departments.

Figure 18:
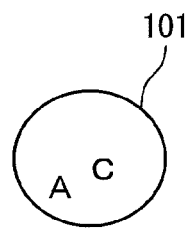
FIG. 18 illustrates operations of the behavior monitoring system according to the first to fourth exemplary embodiments of the present invention.
Figure 19:
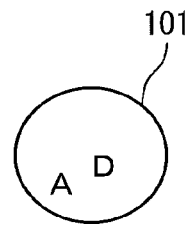
FIG. 19 illustrates operations of the behavior monitoring system according to the first to fourth exemplary embodiments of the present invention.

As shown in FIGS. 18 and 19, a first specific to-be-monitored object and second specific to-be-monitored objects among the plurality of specific to-be-monitored objects are referred to as a specific to-be-monitored object "A" and specific to-be-monitored objects "C and D", respectively. In this case, the foregoing interrelationship indicates whether or not the specific to-be-monitored object "A" and the specific to-be-monitored objects "C and D" belong to the same group. For example, as shown in FIG. 18, the prohibited behavior conditions 24-1 and 24-3 permit the specific to-be-monitored object "A" and the specific to-be-monitored object "C", which belong to the same group, to stay in the predetermined region 101, for the specific to-be-monitored object group "A and C", respectively. For example, as shown in FIG. 19, the prohibited behavior conditions 24-1 and 24-4 prohibit the specific to-be-monitored object "A" and the specific to-be-monitored object "D", which belong to the different groups, to stay in the predetermined region 101, for the specific to-be-monitored object group "A and D", respectively. For example, there is a case that, although only persons belonging to a single department are permitted to use a meeting space (refer to FIG. 18), persons belonging to the specific departments are not permitted to use the same meeting space at the same time. When a person belonging to a first department (specific to-be-monitored object "A") and a person belonging to a second department (specific to-be-monitored object "D") are prohibited from using the same meeting space, staying in the specific area (the meeting space) together with the person belonging to the second department can be set as a prohibited behavior condition for the person belonging to the first department and staying in the specific area (the meeting space) together with the person belonging to the first department can be set as a prohibited behavior condition for the person belonging to the second department (refer to FIG. 19). This example is effective for a case that a person without authority to treat secret information (specific to-be-monitored object "J") is prohibited to approach in solo a cabinet (predetermined region 10) in which the secret information is stored but permitted to approach the cabinet together with a person having authority to treat the secret information (specific to-be-monitored object "A").

Figure 20:
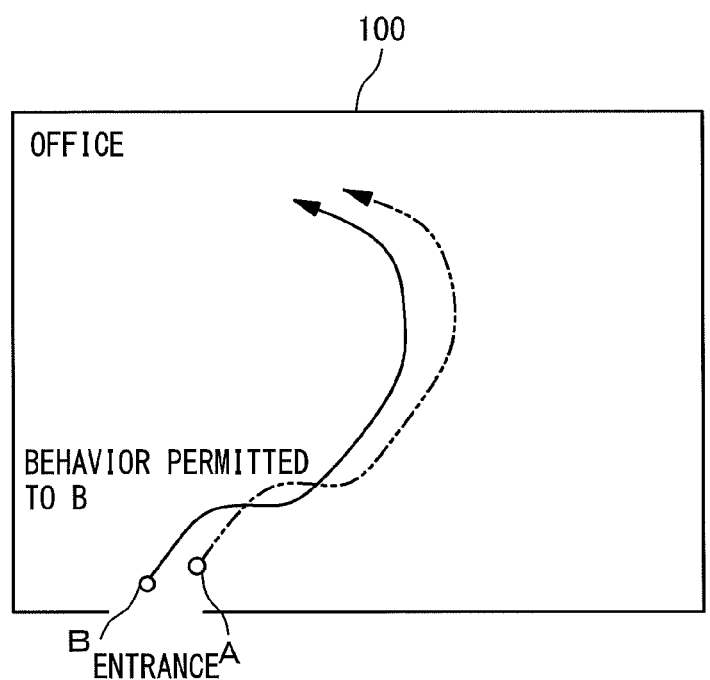
FIG. 20 illustrates operations of the behavior monitoring system according to the first to fourth exemplary embodiments of the present invention.
Figure 21:
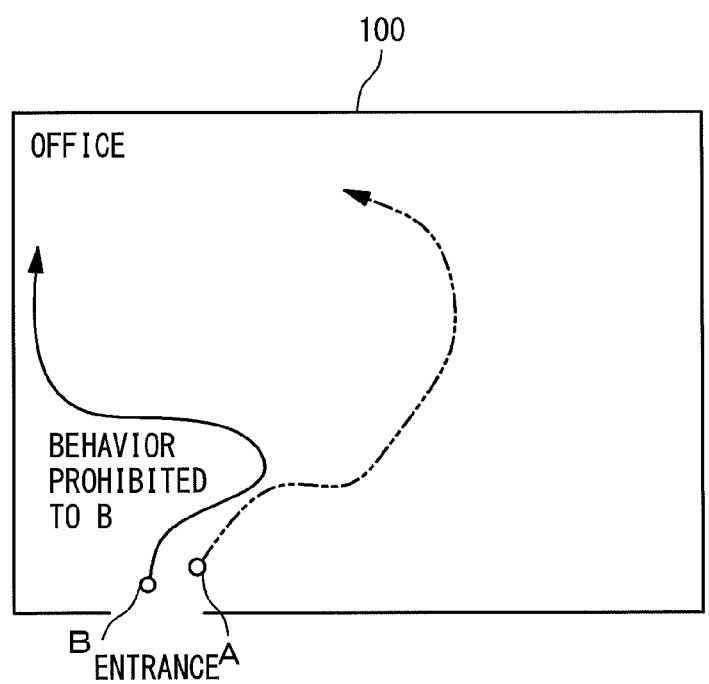
FIG. 21 illustrates operations of the behavior monitoring system according to the first to fourth exemplary embodiments of the present invention.

As shown in FIGS. 20 and 21, a first specific to-be-monitored object and a second specific to-be-monitored object among the plurality of specific to-be-monitored objects are referred to as a specific to-be-monitored object "A" and a specific to-be-monitored object "B", respectively. In this case, the foregoing interrelationship indicates that the specific to-be-monitored object "A" and the specific to-be-monitored object "B" depart from one another such that a distance between them is a predetermined distance or longer. For example, as shown in FIG. 20, the prohibited behavior condition 24-2 requires that the distance between the specific to-be-monitored object "A" and the specific to-be-monitored object "B" is kept at the predetermined distance or shorter in the area 100, for the specific to-be-monitored object group "B". For example, as shown in FIG. 21, the prohibited behavior condition 24-2 prohibits that the specific to-be-monitored object "A" and the specific to-be-monitored object "B" depart from one another such that the distance between them is the predetermined distance or longer in the area 100, for the specific to-be-monitored object group "B". For example, there is a case that a person other than worker of an office is permitted to enter the office together with a worker of the office (refer to FIG. 20) but required to accompany the worker of the office in that case. In such a case, for the person who is not registered as a worker of the office, by detecting that he comes away from the person who enters at the same time such that the distance between them is the predetermined distance or longer, a situation is can be detected that the accompanying person is not in attendance.

Figure 22:
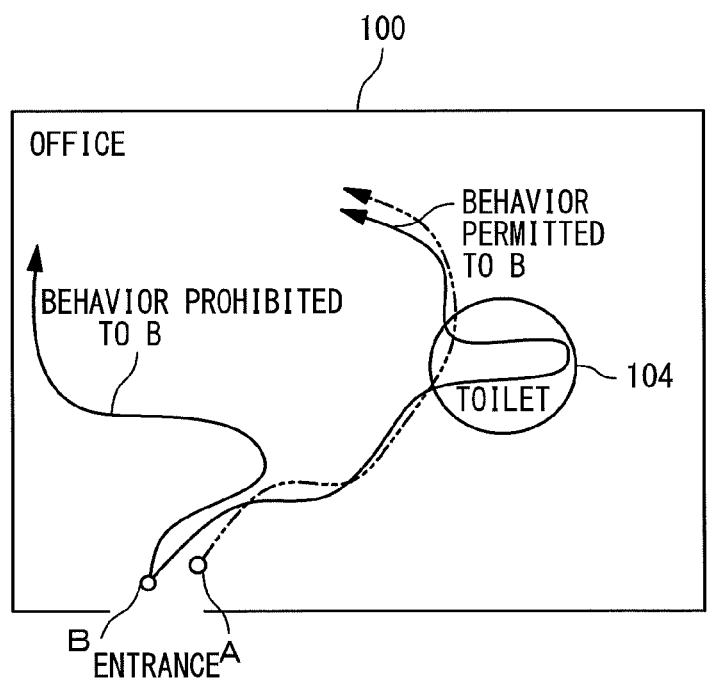
FIG. 22 illustrates operations of the behavior monitoring system according to the first to fourth exemplary embodiments of the present invention.

As shown in FIG. 22, it is assumed that the area 100 includes a specific place 104. The specific place 104 is a toilet, a smoking area or the kike. Also, a first specific to-be-monitored object and a second specific to-be-monitored object among the plurality of specific to-be-monitored objects are referred to as a specific to-be-monitored object "A" and a specific to-be-monitored object "B", respectively. In this case, the foregoing interrelationship indicates that the specific to-be-monitored object "A" and the specific to-be-monitored object "B" depart from one another such that the distance between them is the predetermined distance or longer in the area 100 except the specific place 104. For example, as shown in FIG. 22, the prohibited behavior condition 24-2 requires that the distance between the specific to-be-monitored object "A" and the specific to-be-monitored object "B" is kept at a distance shorter than the predetermined distance in the area 100 except the specific place 104, for the specific to-be-monitored object group "B". The prohibited behavior condition 24-2 prohibits that the specific to-be-monitored object "A" and the specific to-be-monitored object "B" depart form one another such that the distance between them is the predetermined distance or longer in the area 100, for the specific to-be-monitored object "B". In this way, by considering that the accompanying person is not required to be in attendance in the specific place such as toilet or smoking area, the prohibited behavior condition can be that the specific to-be-monitored object and the person who is enter at the same time depart from one another in a place other the specific place such that the distance between them is the predetermined distance or longer.

In the behavior monitoring systems according to the first to fourth exemplary embodiments of the present invention, the plurality of prohibited behavior conditions 24-1 to 24-10 may be a plurality of combinations of the examples shown in FIGS. 11 to 21.

In the behavior monitoring system according to the first to fourth exemplary embodiments of the present invention, the behavior monitoring means 16 specifies the specific to-be-monitored object by executing a face authentication process on the dynamic image data generated by the monitoring camera 40. However, the present invention is not limited to this. For example, the behavior monitoring means 16 can specify the specific to-be-monitored object based on the change in brightness of the dynamic image data. Also, the behavior monitoring means 16 can use an ultrasonic sensor, a temperature sensor, a gravity sensor or the like to specify the specific to-be-monitored object based on the change in measured value of the sensor.

The behavior monitoring systems according to the first to fourth exemplary embodiments of the present invention have been described by assuming that the to-be-monitored object is a person. However, the to-be-monitored object may be a car or a walking robot when feature points can be obtained as the case of the face image.

Although the present invention has been described above in connection with the exemplary embodiments thereof, the present invention is not limited to the above exemplary embodiment. Various modifications understandable to those skilled in the art can be applied to the configurations and details of the present invention within the scope of the present invention.

This application is based upon and claims the benefit of priority from Japanese Patent Application NO. 2007-214976, filed on Aug. 21, 2007, the disclosure of which is incorporated herein its entirely by reference.

The invention claimed is:

1. A behavior monitoring system, comprising:
a storage unit which stores a plurality of pieces of identification information, each piece of identification information respectively identifying a corresponding one of a plurality of persons and one of a plurality of prohibited behavior conditions indicating behaviors respectively prohibited to said plurality of persons in an area and being correlated with interrelationships of the persons;
an entry monitoring unit configured to monitor as specific persons persons which enter said area, and to judge whether or not a specific piece of identification information identifying said specific persons exists in said plurality of pieces of identification information stored in said storage unit, and to specify said interrelationships of said specific persons;
a behavior monitoring unit configured to monitor, based on said specific piece of identification information, said specific persons which behave in said area and to generate a piece of behavior information indicating behaviors of said specific persons, when a piece of identification information coincident with said specific piece of identification information exists in said plurality of pieces of identification information; and
a behavior judging unit configured to select specific prohibited behavior conditions corresponding to said specific piece of identification information from said plurality of prohibited behavior conditions stored in said storage unit based on said specified interrelationships of said specific persons and to produce an alarm when behaviors indicated by said specific prohibited behavior conditions coincide with behaviors indicated by the piece of said behavior information.

2. The behavior monitoring system according to claim 1, further comprising:
a monitoring camera for taking images of said area; and
a monitoring camera control unit which controls said monitoring camera to take images of said area and to generate dynamic image data indicating a dynamic image of said area, wherein each of said plurality of persons holds specific information of itself,
said plurality of pieces of identification information stored in said storage unit respectively include a plurality of specific information indicating said plurality of persons and a plurality of face image data indicating face images of said plurality of persons,
said entry monitoring unit judges whether or not specific information of said specific persons exist in said plurality of specific information stored in said storage unit,
said behavior monitoring unit selects selected face image data corresponding to specific information of said specific persons from said plurality of face image data stored in said storage unit when specific information coincident with specific information of said specific persons exists in said plurality of specific information,
said behavior monitoring unit executes a face recognition process to judge whether or not face images indicated by said selected face image data are included in a dynamic image indicated by said dynamic image data in order to monitor said specific persons which behave in said area,
said behavior monitoring unit generates as said behavior information, behaviors of said specific persons included in a dynamic image indicated by said dynamic image data when face images indicated by said selected face image data are included in a dynamic image indicated by said dynamic image data, and
said behavior judging unit selects said specific prohibited behavior conditions corresponding to said specific piece of identification information including specific information of said specific persons and said selected face image data from said plurality of prohibited behavior conditions stored in said storage unit.

3. The behavior monitoring system according to claim 2, further comprising a communication unit provided at an entrance of said area in order to monitor said specific persons which enter said area,
wherein each of said plurality of persons possesses a holding unit in which said specific information of oneself is held,
specific information held in said holding unit of each of said plurality of persons is readable by said communication unit, and
said entry monitoring unit controls said communication unit to communicate with said holding unit of said specific persons which enter said area and to read specific information of said specific persons from a holding unit of said specific persons.

4. The behavior monitoring system according to claim 2, further comprising a biometrics reader provided at an entrance of said area in order to monitor said specific persons which enter said area,
wherein each of said plurality of persons holds specific information of oneself,
specific information of each of said plurality of persons indicates at least one biometrics of a fingerprint, an iris, a voiceprint and handwriting and is readable by said biometrics reader, and
said entry monitoring unit controls said biometrics reader to read specific information of said specific persons which enter said area.

5. The behavior monitoring system according to claim 2, wherein a gate is provided at an entrance of said area, and
said entry monitoring unit controls said gate to refuse said specific persons to enter said area when said specific piece of identification information does not exist.

6. The behavior monitoring system according to claim 3, wherein a gate is provided at an entrance of said area, and
said entry monitoring unit controls said gate to refuse said specific persons to enter said area when said specific piece of identification information does not exist.

7. The behavior monitoring system according to claim 1, further comprising:
a monitoring camera for taking images of said area;
a monitoring camera control unit which controls said monitoring camera to take images of said area and to generate dynamic image data indicating a dynamic image of said area; and
a camera provided at an entrance of said area in order to monitor said specific persons which enter said area,
wherein said plurality of pieces of identification information stored in said storage unit respectively include a plurality of face image data indicating face images of said plurality of persons,
said entry monitoring unit controls said camera to take images of persons which enters said area as said specific persons and to generate image data indicating an image including face images of said specific persons,
said entry monitoring unit judges whether or not face image data indicating face images of said specific persons exists in said plurality of face image data stored in said storage unit,
when face image data indicating face images coincident with face images of said specific persons exists in said plurality of face image data, said behavior monitoring unit selects said face image data as selected face image data,
said behavior monitoring unit executes a face recognition process to judge whether or not face images indicated by said selected face image data are included in a dynamic image indicated by said dynamic image data in order to monitor said specific persons which behave in said area,
said behavior monitoring unit generates as said behavior information, behaviors of said specific persons included in a dynamic image indicated by said dynamic image data when face images indicated by said selected face image data are included in a dynamic image indicated by said dynamic image data, and
said behavior judging unit selects said specific prohibited behavior information corresponding to said specific piece of identification information including specific information of said specific persons and said selected face image data from said plurality of prohibited behavior conditions stored in said storage unit.

8. The behavior monitoring system according to claim 7, wherein a prohibited behavior condition of said plurality of prohibited behavior conditions stored in said storage unit is an outsider prohibited behavior condition indicating a behavior prohibited to said outsider,
when face image data indicating face images coincident with face images of said specific persons do not exist in said plurality of face image data, said entry monitoring unit stores as a piece of outsider identification information for identifying outsider, outsider face image data indicating face images of said specific persons such that said outsider face image data is correlated to said outsider prohibited behavior condition,
said behavior monitoring unit executes a face recognition process to judge whether or not face images indicated by said outsider face image data are included in a dynamic image indicated by said dynamic image data in order to monitor said specific persons which behave in said area,
said behavior monitoring unit generates as said behavior information, behaviors of said specific persons included in a dynamic image indicated by said dynamic image data when face images indicated by said outsider face image data are included in a dynamic image indicated by said dynamic image data,
said behavior judging unit selects said outsider prohibited behavior condition corresponding to said outsider face image data from said plurality of prohibited behavior conditions stored in said storage unit, and
said behavior judging unit produces an alarm when a behavior indicated by said outsider prohibited behavior condition coincides with behaviors indicated by said behavior information.

9. The behavior monitoring system according to claim 1, wherein a gate is provided at an entrance of said area, and
said entry monitoring unit controls said gate to refuse said specific persons to enter said area when said specific piece of identification information does not exist.

10. The behavior monitoring system according to claim 1, wherein said area includes predetermined region, and
said plurality of prohibited behavior conditions stored in said storage unit indicates permission or prohibition of entry to said predetermined region, for said plurality of persons, respectively.

11. The behavior monitoring system according to claim 10, wherein permission of entry to said predetermined region is determined based on date or time zone in a day.

12. The behavior monitoring system according to claim 10, wherein said area further includes a plurality of regions, and
said plurality of prohibited behavior conditions stored in said storage unit respectively indicate for said entry-permitted persons group, orders for passing through said plurality of regions in entering and leaving said predetermined region.

13. The behavior monitoring system according to claim 1, wherein said area includes predetermined region, and
said plurality of prohibited behavior conditions stored in said storage unit indicates times in which said plurality of persons can stay in said predetermined region, respectively.

14. The behavior monitoring system according to claim 1, wherein said area includes a predetermined region, and
said interrelationships indicate that a first person and a second person of said plurality of persons approach one another in said predetermined region such that a distance between said first person and said second person is shorter than a predetermined distance.

15. The behavior monitoring system according to claim 1, wherein said area includes a predetermined region, and
said interrelationships indicate whether or not a first person and a second person of said plurality of persons belong to a same group in said predetermined region.

16. The behavior monitoring system according to claim 1, wherein said interrelationships indicate that a first person and a second person of said plurality of persons depart from one another in said area such that a distance between said first person and said second person is a predetermined distance or longer.

17. The behavior monitoring system according to claim 1, wherein said area includes a specific place, and
said interrelationships indicate that a first person and a second person of said plurality of persons depart from one another in said area except said specific place such that a distance between said first person and said second person is a predetermined distance or longer.

18. A behavior monitoring method comprising:

monitoring as specific persons, persons which enter an area;

judging, by referring to a database in which a plurality of pieces of identification information respectively identifying a plurality of persons and a plurality of prohibited behavior conditions indicating behaviors respectively prohibited to said plurality of persons in said area and being correlated with interrelationships of the persons, whether or not a specific piece of identification information identifying said specific persons exists in said plurality of pieces of identification information so as to specify said interrelationships of said specific persons;

monitoring, based on said specific piece of identification information, said specific persons which behave in said area when a piece of identification information coincident with said specific piece of identification information exists in said plurality of pieces of identification information;

generating behavior information indicating behaviors of said specific persons;

selecting, by referring to said database, specific prohibited behavior conditions corresponding to said specific piece of identification information from said plurality of prohibited behavior conditions based on said specified interrelationships of said specific persons; and producing an alarm when behaviors indicated by said specific prohibited behavior conditions coincide with behaviors indicated by the piece of said behavior information.

19. A non-transitory computer-readable recording medium which records a computer program for causing a computer to execute a behavior monitoring method comprising:

monitoring as specific persons persons which enter an area;

judging by referring to a database in which a plurality of pieces of identification information respectively identifying a plurality of persons and a plurality of prohibited behavior conditions indicating behaviors respectively prohibited to said plurality of persons in said area and being correlated with interrelationships of the persons, whether or not a specific piece of identification information identifying said specific persons exists in said plurality of pieces of identification information so as to specify said interrelationships of said specific persons;

monitoring, based on said specific piece of identification information, said specific persons which behave in said area when a piece of identification information coincident with said specific piece of identification information exists in said plurality of pieces of identification information;

generating behavior information indicating behaviors of said specific persons;

selecting, by referring to said database, specific prohibited behavior conditions corresponding to said specific piece of identification information from said plurality of prohibited behavior conditions based on said specified interrelationships of said specific persons; and producing an alarm when behaviors indicated by said specific prohibited behavior conditions coincide with behaviors indicated by the piece of said behavior information.

* * * * *

UNITED STATES PATENT AND TRADEMARK OFFICE
CERTIFICATE OF CORRECTION

PATENT NO. : 8,525,678 B2
APPLICATION NO. : 12/674295
DATED : September 3, 2013
INVENTOR(S) : Akira Monden Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this
Fifteenth Day of September, 2015

Michelle K. Lee
*Director of the United States Patent and Trademark Office*